US012380464B2

(12) United States Patent
Grover

(10) Patent No.: US 12,380,464 B2
(45) Date of Patent: Aug. 5, 2025

(54) REAL-TIME GUARANTEED CAMPAIGN DELIVERY OPTIMIZATION USING BROADCAST SCHEDULES AND HISTORIC VIEWING DATA

(71) Applicant: Roku, Inc., San Jose, CA (US)

(72) Inventor: Matthew Grover, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/089,930

(22) Filed: Nov. 5, 2020

(65) Prior Publication Data

US 2022/0027942 A1 Jan. 27, 2022

Related U.S. Application Data

(60) Provisional application No. 63/056,988, filed on Jul. 27, 2020.

(51) Int. Cl.
*G06Q 30/0242* (2023.01)
*G06Q 30/0251* (2023.01)
(Continued)

(52) U.S. Cl.
CPC ..... *G06Q 30/0243* (2013.01); *G06Q 30/0246* (2013.01); *G06Q 30/0254* (2013.01);
(Continued)

(58) Field of Classification Search
CPC .......... G06Q 30/0243; G06Q 30/0254; G06Q 30/0246; G06Q 30/0273; H04N 21/812;
(Continued)

(56) References Cited

U.S. PATENT DOCUMENTS 5,848,396 A * 12/1998 Gerace ............... G06Q 30/0204
705/7.29
6,698,020 B1 * 2/2004 Zigmond ............. H04N 21/454
725/139
(Continued)

OTHER PUBLICATIONS

M. Covell, Advertisement Detection and Replacement using Acoustic and Visual Repetition, Oct. 1, 2006, IEEE, 2006 IEEE Workshop on Multimedia Signal Processing (2006, pp. 461-466).*

*Primary Examiner* — Arthur Duran
(74) *Attorney, Agent, or Firm* — Sterne, Kessler, Goldstein & Fox P.L.L.C.

(57) ABSTRACT

In one aspect, an example method includes (i) determining an estimated number of replacement advertisement segment viewings remaining before an end date of a first advertising campaign; (ii) determining a number of impressions remaining for the first advertising campaign in order to reach a guaranteed total; (iii) determining, using the estimated number of replacement advertisement segment viewings and the number of impressions remaining, a first value of serving a first replacement advertising segment corresponding to the first advertising campaign to a content-presentation device; (iv) determining a second value of serving a second replacement advertisement segment corresponding to a second advertising campaign to the content presentation device; (v) selecting the first replacement advertisement segment rather than the second replacement advertisement segment based on the first value being greater than the second value; and (vi) causing the first replacement advertisement segment to be transmitted to the content-presentation device.

14 Claims, 10 Drawing Sheets

(51) Int. Cl.
*G06Q 30/0273* (2023.01)
*H04N 21/438* (2011.01)
*H04N 21/44* (2011.01)
*H04N 21/442* (2011.01)
*H04N 21/81* (2011.01)

(52) U.S. Cl.
CPC ..... *G06Q 30/0273* (2013.01); *H04N 21/4383* (2013.01); *H04N 21/44016* (2013.01); *H04N 21/44218* (2013.01); *H04N 21/44222* (2013.01); *H04N 21/812* (2013.01)

(58) Field of Classification Search
CPC ......... H04N 21/4383; H04N 21/44222; H04N 21/44016; H04N 21/44218
See application file for complete search history.

(56) References Cited

U.S. PATENT DOCUMENTS

| | | | |
|---|---|---|---|
| 10,779,042 B1* | 9/2020 | Gupta | H04N 21/23418 |
| 2003/0159157 A1* | 8/2003 | Chan | H04N 21/4532 |
| | | | 725/38 |
| 2006/0211369 A1* | 9/2006 | Steelberg | H04N 21/25891 |
| | | | 455/3.06 |
| 2006/0253330 A1* | 11/2006 | Maggio | H04N 21/44218 |
| | | | 705/14.2 |
| 2007/0288953 A1* | 12/2007 | Sheeman | G06Q 30/08 |
| | | | 725/34 |
| 2008/0040224 A1* | 2/2008 | Roker | G06Q 30/02 |
| | | | 709/224 |
| 2011/0016479 A1* | 1/2011 | Tidwell | H04N 21/6582 |
| | | | 725/9 |
| 2011/0016482 A1* | 1/2011 | Tidwell | G06Q 30/0251 |
| | | | 725/35 |
| 2011/0202961 A1* | 8/2011 | Asano | G08B 21/0423 |
| | | | 725/46 |
| 2012/0321278 A1* | 12/2012 | Walker | H04N 21/4263 |
| | | | 386/238 |
| 2013/0036434 A1* | 2/2013 | Shkedi | H04N 21/42684 |
| | | | 725/14 |
| 2013/0091019 A1* | 4/2013 | Mallon | G06Q 30/0251 |
| | | | 705/14.69 |
| 2013/0144723 A1* | 6/2013 | Green | H04N 21/2547 |
| | | | 705/14.69 |
| 2014/0129325 A1* | 5/2014 | Zinger | G06Q 30/0241 |
| | | | 705/14.46 |
| 2014/0180829 A1* | 6/2014 | Umeda | G06Q 30/0273 |
| | | | 705/14.69 |
| 2014/0244429 A1* | 8/2014 | Clayton | G06Q 30/0631 |
| | | | 705/26.7 |
| 2017/0070789 A1* | 3/2017 | Liassides | H04N 21/44204 |
| 2018/0278973 A1* | 9/2018 | Grover | H04N 21/23418 |
| 2020/0382843 A1* | 12/2020 | Brehm | H04N 21/4825 |
| 2021/0035163 A1* | 2/2021 | Peris | G06Q 30/0243 |

* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

|  |  |  |  |  |  |  |
|---|---|---|---|---|---|---|
| T9 |  |  | Compare first fingerprint data and second fingerprint data |  |  |  |
| T10 |  |  | Detect a match between first fingerprint data and second fingerprint data |  |  |  |
| T11 |  |  | Identify the channel on which the second content is being received |  |  |  |
| T12 |  |  | Generate metadata associated with the identified channel |  |  |  |
| T13 |  |  | Transmit an indication of the identified channel and the associated metadata |  |  |  |
| T14 |  |  |  |  |  | Receive the indication of the identified channel and the associated metadata |

Figure 4B

|  |  |  |  |  |  |  |  |  |
|---|---|---|---|---|---|---|---|---|
| T15 |  |  |  |  |  |  |  |  |
| T16 | Transmit third content |  |  |  |  |  |  |  |
| T17 | Generate third fingerprint data and third metadata |  |  |  |  |  |  |  |
| T18 | Transmit third fingerprint data and third metadata |  |  |  |  |  |  |  |
| T19 |  |  |  | Receive modifiable content segment |  |  |  |  |
| T20 |  |  |  | Generate fourth fingerprint data and fourth metadata |  |  |  |  |
| T21 |  |  |  | Transmit fourth fingerprint data and fourth metadata |  |  |  |  |
| T22 |  |  |  |  | Receive third fingerprint data and third metadata |  |  |  |
| T23 |  |  |  |  | Receive fourth fingerprint data and fourth metadata |  |  |  |
|  |  | Determine historical content consumption data |  |  |  |  |  |  |

Figure 4C

| | | |
|---|---|---|
| T24 | Compare at least a portion of third fingerprint data and at least a portion of fourth fingerprint data | |
| T25 | Detect a match between at least a portion of third fingerprint data and at least a portion of fourth fingerprint data | |
| T26 | Identify an upcoming content modification opportunity on the identified channel | |
| T27 | Transmit the third fingerprint data and the third metadata | |
| T28 | | Receive third fingerprint data and third metadata |
| T29 | | Receive fifth content |
| T30 | | Output for presentation fifth content |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | Receive request and select supplemental content | | | |
| T37 | | | | Transmit request for link | | | |
| T38 | | | | | | | Transmit link |

Figure 4E

|  |  |  |  |  |  |  |
|---|---|---|---|---|---|---|
| T39 |  |  | Transmit link |  |  |  |
| T40 | Receive link and retrieve supplemental content |  |  |  |  |  |
| T41 | Perform content modification operation |  |  |  |  |  |

Figure 4F

REAL-TIME GUARANTEED CAMPAIGN DELIVERY OPTIMIZATION USING BROADCAST SCHEDULES AND HISTORIC VIEWING DATA

CROSS-REFERENCE TO RELATED APPLICATIONS

This disclosure claims priority to U.S. Provisional Patent App. No. 63/056,988, filed on Jul. 27, 2020, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

Guaranteed advertising campaigns are advertising campaigns in which an advertiser purchasers a guarantee that their advertisement will be shown a minimum number of times. If the advertising campaign does not reach the guaranteed total, then the advertiser may be entitled to a refund. Non-guaranteed advertising campaigns are advertising campaigns in which an advertiser pays for each impression regardless of how many impressions are actually sold.

Advertising campaigns sometimes have an associated cost, such as an associated cost per thousand impressions (CPM). The CPM of a guaranteed advertising campaign can be calculated by dividing the total budget by the number of requested impressions. Some advertising campaigns have an end date after which the advertiser will not pay for any more impressions.

SUMMARY

In one aspect, an example method is disclosed. The method includes (i) determining, by a computing system, an estimated number of replacement advertisement segment viewings remaining before an end date of a first advertising campaign; (ii) determining, by the computing system, a number of impressions remaining for the first advertising campaign in order to reach a guaranteed total of the first advertising campaign; (iii) determining, by the computing system using the estimated number of replacement advertisement segment viewings and the number of impressions remaining, a first value of serving a first replacement advertising segment corresponding to the first advertising campaign to a content-presentation device; (iv) determining, by the computing system, a second value of serving a second replacement advertisement segment corresponding to a second advertising campaign to the content presentation device; (v) selecting, by the computing system, the first replacement advertisement segment rather than the second replacement advertisement segment based on the first value being greater than the second value; and (vi) causing, by the computing system, the first replacement advertisement segment to be transmitted to the content-presentation device.

In another aspect, an example non-transitory computer-readable medium is disclosed. The computer-readable medium has stored thereon program instructions that upon execution by a processor, cause performance of a set of acts including (i) determining an estimated number of replacement advertisement segment viewings remaining before an end date of a first advertising campaign; (ii) determining a number of impressions remaining for the first advertising campaign in order to reach a guaranteed total of the first advertising campaign; (iii) determining, using the estimated number of replacement advertisement segment viewings and the number of impressions remaining, a first value of serving a first replacement advertising segment corresponding to the first advertising campaign to a content-presentation device; (iv) determining a second value of serving a second replacement advertisement segment corresponding to a second advertising campaign to the content presentation device; (v) selecting the first replacement advertisement segment rather than the second replacement advertisement segment based on the first value being greater than the second value; and (vi) causing the first replacement advertisement segment to be transmitted to the content-presentation device.

In another aspect, an example computing system is disclosed. The computing system is configured for performing a set of acts including (i) determining an estimated number of replacement advertisement segment viewings remaining before an end date of a first advertising campaign; (ii) determining a number of impressions remaining for the first advertising campaign in order to reach a guaranteed total of the first advertising campaign; (iii) determining, using the estimated number of replacement advertisement segment viewings and the number of impressions remaining, a first value of serving a first replacement advertising segment corresponding to the first advertising campaign to a content-presentation device; (iv) determining a second value of serving a second replacement advertisement segment corresponding to a second advertising campaign to the content presentation device; (v) selecting the first replacement advertisement segment rather than the second replacement advertisement segment based on the first value being greater than the second value; and (vi) causing the first replacement advertisement segment to be transmitted to the content-presentation device.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
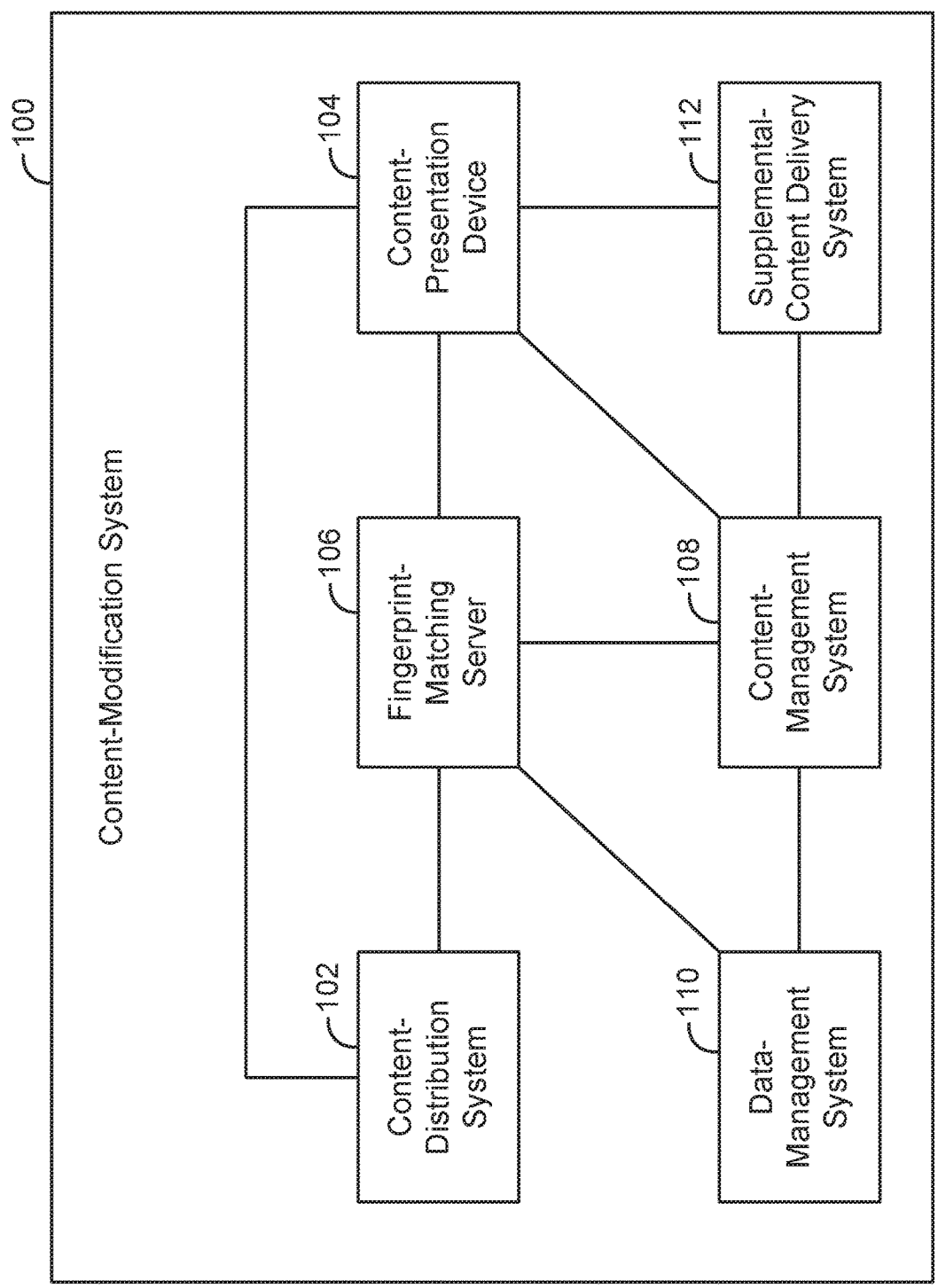
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

The content-modification system can include a content-management system that receives requests for supplemental content for use in connection with replacing a given advertisement segment. When presented with an opportunity to select a replacement advertisement segment from among multiple replacement advertisement segments, it may be desirable for the content-management system to select a highest paying replacement advertisement segment, in order to maximize revenue. For instance, each of multiple replacement advertisement segments may have an associated CPM, and the content-management system can select a replacement advertisement segment having a highest CPM.

Unfortunately, however, selecting a replacement advertisement segment on the basis of CPM can lead to issues in scenarios in which one or more of the replacement advertisement segments is associated with a guaranteed advertising campaign. In some examples, selecting a replacement advertisement segment having a highest CPM instead of a replacement advertising segment associated with a guaranteed advertising campaign can lead to an issue in which an advertisement publisher does not complete the guaranteed advertising campaign and is not entitled to payment for the guaranteed advertising campaign.

Differing end dates of advertising campaigns can further complicate the issue of selecting a replacement advertisement segment. For instance, if a non-guaranteed advertising campaign is going to end soon and before a guaranteed advertising campaign ends, it may make sense from a revenue-optimization point of view to select and serve a replacement advertisement segment that is associated with the non-guaranteed advertising campaign.

Disclosed herein are methods and systems for selecting replacement advertising based on characteristics of different advertising campaigns and predictions about future replacement advertisement segment viewings. In an example method, a computing system can determine an estimated number of replacement advertising segment viewings remaining before an end date of a first advertising campaign. In addition, the computing system can determine a number of impressions remaining for the first advertising campaign in order to reach a guaranteed total of the first advertising campaign. Further, the computing system can use the estimated number of replacement advertising segment viewings and the number of impressions remaining to determine a first value of serving a first replacement advertising segment corresponding to the first advertising campaign to a content-presentation device. The computing system can also determine a second value of serving a second replacement advertisement segment corresponding to a second advertising campaign to the content-presentation device. The computing system can then select the first replacement advertisement segment rather than the second replacement advertisement segment based on the first value being greater than the second value, and cause the first replacement advertisement segment to be transmitted to the content-presentation device.

II. Example Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
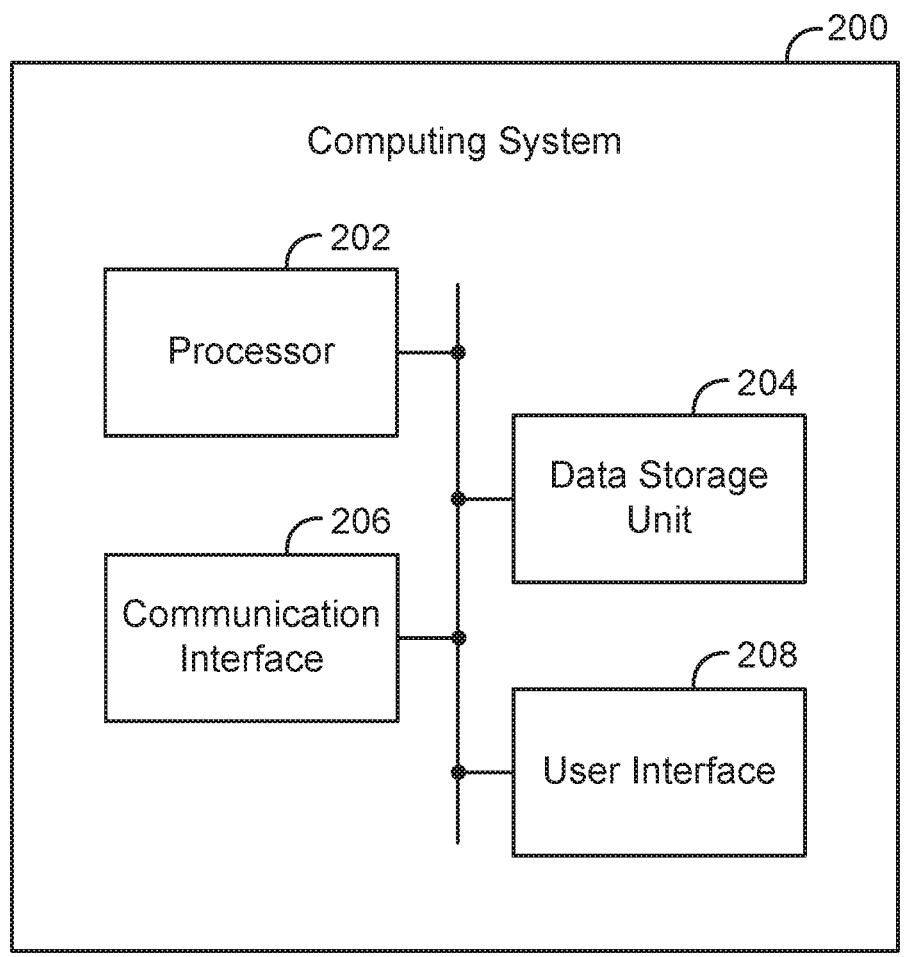
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
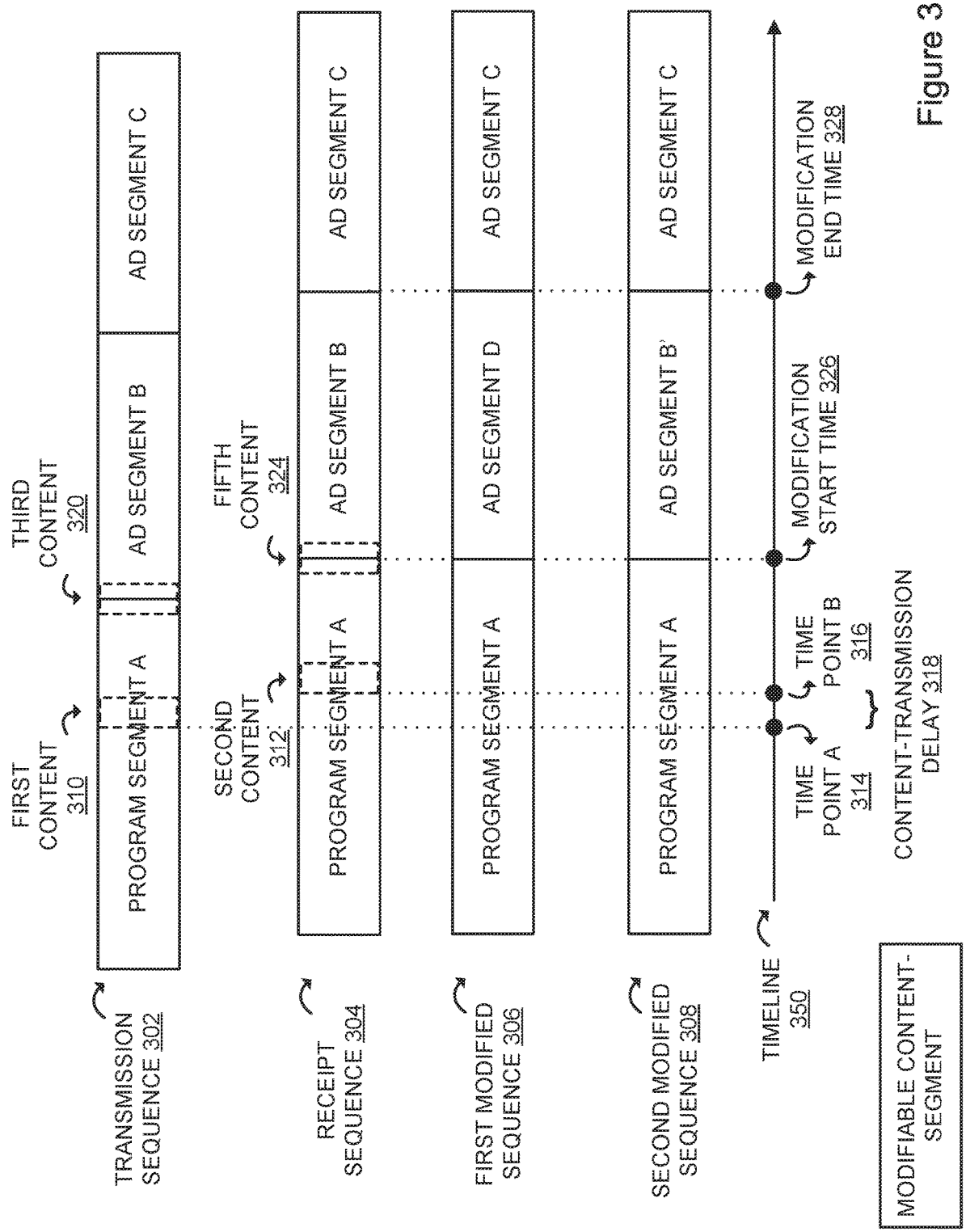
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, a duration for which the content-presentation device 104 viewed specific content (e.g., two seconds, five seconds, thirty seconds), etc. This type of data is referred to herein as "historical content consumption data."

As such, during a time-period T15, the data-management system 110 can determine historical content consumption data associated with the content-presentation device 104.

One of ordinary skill in the art will appreciate that the operations carried out in conjunction with time-periods T1-T15 can be repeatedly carried out over the course of multiple viewing sessions during which content is received and output by content-presentation device 104. As such, data-management system 110 can receive numerous indications of what specific content the content-presentation device 104 has received and output.

Further, data-management system 110 can aggregate and analyze the indications of what specific content the content-presentation device has received and output to determine historical content consumption data that models a probability that the content-presentation device will be tuned to various channels as a function of various factors. As one example, for each of multiple channels, the historical content consumption data can include data indicative of a probability that the content-presentation device will be tuned to the channel based on an identifier of the channel. For instance, the historical content consumption data may specify that the content-presentation device has a ten percent change of being tuned to a first channel, a ten percent chance of being tuned to a second channel, a one percent change of being tuned to a third channel, and a fifty percent chance of being tuned to a fourth channel.

In some instances, the probabilities for the channels can be subdivided based on time of day or daypart (e.g., daytime, evening, overnight). Additionally or alternatively, the probabilities for the channels can be further subdivided based on day of the week or based on weekdays versus weekend days.

In some examples, data-management system 110 might have limited information regarding what specific content a content-presentation device has received and output or might not have any information regarding what specific content a content-presentation device has received and output. In such a scenario, data-management system 110 can use default probabilities to generate historical content consumption data for the content-presentation device. The default probabilities used to generate the historical content consumption data can vary based on demographic information for the content-presentation device.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in three hundred fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. For instance, the content-management system 108 can select a replacement advertisement segment from among multiple replacement advertisement segments that are available for selection.

As noted above, selecting a replacement advertisement segment on the basis of CPM can lead to issues in scenarios in which one or more of the replacement advertisement segments is associated with a guaranteed advertising campaign. In some examples, selecting a replacement advertisement segment having a highest CPM instead of a replacement advertising segment associated with a guaranteed advertising campaign can lead to an issue in which an advertisement publisher does not complete the guaranteed advertising campaign and is not entitled to payment for the guaranteed advertising campaign.

For instance, an advertisement publisher may have the option of choosing between a first replacement advertisement segment associated with a guaranteed advertising campaign and a second replacement advertisement segment associated with a non-guaranteed advertising campaign. Further, the guaranteed advertising campaign may have a CPM of $10 and need only five more impressions to reach a guaranteed total and therefore unlock payment of a full budget of $10,000. On the other hand, the non-guaranteed advertising campaign may have a CPM of $15. When presented with the opportunity to serve five replacement advertisement segments, a computing system that selects replacement advertisement segments on the basis of CPM alone would select the second replacement advertisement segment five times, yielding $$15/1000*5=$0.075$. With this approach, because the replacement advertisement segment associated with the guaranteed advertising campaign was not selected, the advertisement publisher might miss out on the opportunity to collect $10,000.

In addition, differing end dates of advertising campaigns can further complicate the issue of selecting a replacement advertisement segment. For instance, continuing with the example above, if the non-guaranteed advertising campaign is going to end soon and before the guaranteed advertising campaign will end, it may make sense from a revenue-optimization point of view to select and serve the second replacement advertisement segment that is associated with the non-guaranteed advertising campaign. However, it may also be difficult to predict how many future opportunities to serve replacement advertisement segments will be available. Hence, from a revenue-optimization perspective, when dealing with advertising campaigns having different characteristics (e.g., guaranteed vs. non-guaranteed, differing end dates, differing CPMs) and an unknown number of future opportunities to serve replacement advertisement segments, it can be difficult to select a replacement advertisement segment.

In accordance with the present disclosure, the content-management system 108 can receive and consider various data to help inform which replacement advertisement segment to select. For instance, the content-management system 108 can select a replacement advertisement segment based on characteristics of different advertising campaigns and predictions about future replacement advertisement segment viewings.

As one example, the content-management system 108 can determine an estimated number of replacement advertisement segment viewings remaining before an end date of a first advertising campaign. In addition, the content-management system 108 can determine a number of impressions remaining for the first advertising campaign in order to reach a guaranteed total of the first advertising campaign. Using the estimated number of replacement advertisement segment viewings and the number of impressions remaining, the content-management system 108 can determine a first value of serving a first replacement advertisement segment corresponding to the first advertising campaign to the content-presentation device 104. Further, the content-management system 108 can determine a second value of serving a second replacement advertisement segment corresponding to a second advertising campaign to the content-presentation device 104. Still further, the content-management system 108 can select the first replacement advertisement segment rather than the second replacement advertisement segment based on the first value being greater than the second value, and cause the first replacement advertisement segment to be transmitted to the content-presentation device 104.

In some examples, the content-management system 108 can determine the estimated number of replacement advertisement segment viewings remaining by estimating the number of future impression opportunities specific content-presentation devices will experience before the end date. For instance, for each of multiple content-presentation devices, the content-management system 108 can determine an estimated number of content replacement operation opportunities remaining before the end date of the first advertising campaign. The content-management system 108 can then sum the estimated number of content replacement operation opportunities for the multiple content-presentation devices to determine the estimated number of replacement advertisement segment viewings remaining.

To determine the estimated number of content replacement operation opportunities remaining for a given content-presentation device, the content-management system 108 can determine a plurality of content replacement operation opportunities available on one or more channels before the end date of the first advertising campaign. In one approach, the content-management system 108 can determine the number and timing of replacement advertisement slots available on each channel. For times when a broadcast schedule of program content is available, the number of content replacement operation opportunities available for a channel can be calculated from the broadcast schedule. On the other hand, for times when a broadcast schedule of program content is unavailable, the number of content replacement operation opportunities can be estimated based on previous program logs for a channel.

For context, broadcast schedules and related concepts will now be described. As noted above, in some situations, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can include various components to help facilitate scheduling the broadcast of content and related operations.

For example, the content-distribution system 102 can include a scheduling system, which can take various forms. An example scheduling system is WO Traffic provided by WideOrbit, Inc. of San Francisco, CA. Another example scheduling system is OSi-Traffic provided by Harris Corporation of Melbourne, FL.

The scheduling system can perform various acts and/or functions related to scheduling and/or managing operation of the content-distribution system 102 or components thereof. For example, the scheduling system can create and/or modify a broadcast schedule, perhaps based on input received from a user via a user interface. A broadcast schedule serves as a schedule or outline of a broadcast of content by a content-distribution system during a given time period. A broadcast schedule is sometimes referred to in the industry as a "traffic log."

The content-distribution system 102 can also include a sequencing system that can process records in the broadcast schedule. Based on the processed records, the sequencing system can control one or more components (e.g., content servers, routers, switches, digital-video effect (DVE) systems etc.) of the content-distribution system 102 to facilitate the content-distribution system 102 performing various acts. This, in turn, can facilitate the content-distribution system 102 generating and/or outputting content, which can serve as or be part of the broadcast content. A sequencing system is sometimes referred to in the industry as a broadcast automation system.

Typically, a broadcast schedule spans a twenty-four hour period, but does not align with a calendar day. Rather a broadcast schedule typically spans from 5:00 am ET of one day to 5:00 am ET of the next day. According to this convention, for example, a "Mar. 6, 2012 traffic log" spans from 5:00 am ET on Mar. 6, 2012 to 5:00 am ET on Mar. 7, 2012.

A broadcast schedule can include multiple records, each corresponding to a respective event. One common type of event is the broadcast of a content segment. As noted above, a content segment can take various forms. One example content segment is a program segment, such as a television-show segment or a movie segment. Another example content segment is an advertisement segment, such as a commercial.

As noted above, a record of a broadcast schedule can correspond to an event. Each record can also include various data related to the event. For example, the record can include a description, a start time, a start-time type, a duration, a content-source identifier, and/or a content-segment identifier.

The description describes the event. For example, in the case where the event includes broadcasting a content segment, the description can indicate a title of the content segment. In the case where the content segment is a program segment, the description can further indicate a segment number.

The start time indicates a scheduled start time of the event. For example, in the case where the event includes broadcasting a content segment, the start time can indicate a time at which the content-distribution system 102 is scheduled to start broadcasting the content segment. In some instances, the start time of an event can also represent an end time of a preceding event.

The start-time type indicates how and/or when sequencing system determines the start time for the event. The start-time type can be absolute, calculated, or manual. An absolute start-time type indicates that the start time is a fixed time that is not dependent on the occurrence of trigger event. This is sometimes referred to in the industry as a "hard" start time. A manual start-time type indicates that the start time is when a particular trigger event occurs. A calculated start-time type indicates that the start time is when the preceding event ends. Where a record indicates a calculated start-time type, the sequencing system can determine the start time for the corresponding event only after the sequencing system determines the start time and the duration of the preceding event.

As noted above, a manual start-time type indicates that the start time is when a trigger event occurs. In one example, the trigger event can be the sequencing system receiving particular input from a user via a user interface. In one example, this can allow a technical director to manually cause the content-distribution system 102 to transition from broadcasting a news program segment to broadcasting an advertisement segment. This type of transition is sometimes referred to in the industry as a "commercial roll."

In another example, the trigger event can be the sequencing system making a determination that a particular signal is embedded in a content segment being broadcast. In one example, the particular signal can be a commercial roll signal, such as an audio tone according to the Audio Cue Tone standard set forth in ANSI/SCTE 35 2013. In one example, this can allow a provider of a program segment to automatically cause the content-distribution system 102 to transition from broadcasting the program segment to broadcasting an advertisement segment.

The duration indicates a scheduled duration of the event. For example, in the case where the event includes broadcasting a content segment that is seven minutes long, the duration can indicate seven minutes.

The content-source identifier identifies a content source related to the event. For example, in the case where the event includes broadcasting a content segment that is expected to be received and output by a satellite receiver, the content-source identifier can be an identifier that maps to the receiver. As another example, in the case where the event includes broadcasting a content segment expected to be played out by a content server, the content-source identifier can be an identifier that maps to the server. As yet another example, in the case where the event includes broadcasting a content segment that is expected to be generated and output by a news production system (NPS), the content-source identifier can be an identifier that maps to the NPS.

The content-segment identifier identifies a content segment related to the event. For example, in the case where the content segment item is a commercial, the content-segment identifier can be an Industry Standard Coding Identification (ISCI) key. In another example, the content-segment identifier can be an identifier that maps to a location where a file representing the content segment is stored. A content-segment identifier is sometimes referred to in the industry as a "house identifier."

In some examples, a broadcast schedule includes multiple records represented as multiple ordered rows, where each record corresponds to a respective event. For each event, the respective record includes various data related to the event. In particular, each record includes at least one of a description, a start time, a start-time type, a duration, a content-source identifier, and a content-segment identifier.

The content-management system 108 can access broadcast-schedule data and use broadcast-schedule data to facilitate identify a number of upcoming content replacement operation opportunities on one or more channels. For instance, this can involve (i) accessing first broadcast-schedule data associated with a channel, (ii) extracting, from among the accessed first broadcast-schedule data associated with the channel, second broadcast-schedule data related to one or more broadcast-related events scheduled within a predefined upcoming duration (e.g., four hours, twenty-four hours, etc.), and (iii) using the extracted second broadcast-schedule data to identify an upcoming content replacement operation opportunity on the channel.

The content-management system 108 can use the accessed broadcast-schedule data to identify an upcoming content replacement operation opportunity on the channel in various ways. For example, this can involve (i) detecting a match between the accessed broadcast-schedule data and reference data that corresponds with a reference modifiable content segment, and (ii) identifying the upcoming content replacement operation opportunity on the channel based at least in part on the detected match. For example, the content-management system 108 can detect a match between an ISCI key of an advertisement segment scheduled for broadcast and an ISCI key that corresponds to a reference modifiable content segment. As another example, the content-management system 108 can detect a match between a house identifier of an advertisement segment and a house identifier that corresponds to a reference modifiable content segment.

Given the timing information for content replacement operation opportunities (such as a date, time, and channel of a content replacement operation opportunity), the content-management system 108 can then estimate the probability that the given content-presentation device will be watching each channel at each opportunity time. The content-management system 108 can then use the probabilities for the given content-presentation device to determine the number of content replacement operation opportunities remaining for the given content-presentation device.

As a simplified example, for a given content-presentation device, there may be three content replacement operation opportunities: a first opportunity on a first channel at a first time, a second opportunity on the first channel at a second time, and a third opportunity on a second channel at a third time. Further, the content-management system may determine that the content-presentation device has a ten percent chance of watching the first channel at the first time, a twenty percent chance of watching the first channel at the second time, and a forty-five percent chance of watching the second channel at the third time. Given these probabilities, the content-management system can determine the estimated number of replacement opportunities remaining for the content-presentation device using an expected value calculation as follows: 10%*1+20%*1+45%*1=0.75 estimated replacement opportunities remaining.

The content-management system 108 can determine the probability that a given content-presentation device will be watching a given channel at a given opportunity time in various ways. For instance, the content-management system 108 can estimate such a probability using historical content consumption data received from the data-management system 110. As noted above, for each of multiple channels, the historical content consumption data can include data indicative of a probability that the content-presentation device will be tuned to a respective channel. Further, the historical content consumption data can include probabilities that vary based on time of day, day of the week, and/or day part.

In some examples, the content-management system 108 can determine the probability that a given content-presentation device will be watching a given channel at a given opportunity time based on a current channel to which the content-presentation device is tuned. For instance, there may be a content replacement operation opportunity on a given channel at a given opportunity time. If the given opportunity time is within a threshold amount of time of a current time and the content-presentation device is currently tuned to the given channel, the content-management system 108 can determine that the probability is relatively high (e.g., ninety percent, seventy-five percent, etc.).

In some examples, the content-management system 108 can also use content replacement operation success rates for specific content-presentation devices to determine the estimated number of replacement advertisement segment viewings remaining. For a given content-presentation device, the content replacement operation success rate is indicative of a percentage of attempted content replacement operations that actually resulted in a viewed replacement advertisement segment. Providers of advertising inventory are generally only paid for a viewing impression if a viewer has watched a certain amount or percentage of an advertisement, referred to as a pay point. In some examples, the content replacement operation success rate may indicate a percentage of attempted content replacement operations for which the content-presentation device presented a replacement advertisement segment for a duration that satisfies a pay point of the replacement advertisement segment. The content-management system can use the content replacement operation success rate for a given content-presentation device to weight the estimated number of content replacement operation opportunities remaining for the content-presentation device. As an example, if the estimated number of content replacement operation opportunities remaining for the content-presentation device is fifteen and the content replacement operation success rate for the content-presentation device is seventy-five percent, the content-management system 108 can determine an estimated number of content replacement operation opportunities remaining as follows: 15*75%=11.25.

In some examples, the content-management system 108 can also consider demographic information of content-presentation devices and advertising campaigns when determining the estimated number of replacement advertisement segment viewings remaining. For instance, the estimated number of replacement advertisement segment viewings remaining can be a total estimated number of replacement advertisement segment viewings remaining before an end date of an advertising campaign for each of multiple content-presentation devices that are part of a target demographic for the advertising campaign.

After determining the estimated number of replacement advertisement segment viewings remaining and the number of impressions remaining for a guaranteed advertising campaign, the content-management system 108 can determine the value of serving a replacement advertisement segment associated with the advertising campaign in various ways. As one example, a baseline CPM for a first replacement advertisement segment of a first advertising campaign can be determined based on a total budget for the first advertising campaign and the guaranteed total of the first advertising campaign. For instance, the content-management system 108 can divide the total budget by the guaranteed total to determine the baseline CPM. Further, the content-management system can then use the estimated number of replacement advertisement segment viewings and the number of impressions remaining to convert the baseline CPM to a calculated CPM.

In general, converting the baseline CPM to the calculated CPM using the estimated number of replacement advertisement segment viewings and the number of impressions remaining causes the calculated CPM to increase as the estimated number of replacement advertisement segment viewings decreases and approaches the number of impressions remaining for the first advertising campaign. For instance, the content-management system 108 can determine the calculated CPM by: subtracting the number of impressions remaining from the estimated number of replacement advertisement segment viewings to determine a difference; multiplying the difference by a weight factor; and dividing the total budget for the advertising campaign by the product of the difference and the weight factor.

Additionally or alternatively, the content-management system 108 can convert the baseline CPM to the calculated CPM using a length of time remaining until the end date of the first advertising campaign, such that the calculated CPM increases as the length of time decreases.

On the other hand, for a replacement advertisement segment that is associated with a non-guaranteed advertising campaign, the content-management system can determine the value of serving the replacement advertisement segment based on a CPM of the non-guaranteed advertising campaign. For instance, the content-management system 108 can divide the CPM of the non-guaranteed advertising campaign by one-thousand to determine a value of serving the replacement advertisement segment.

After determining a first value of serving a first replacement advertisement segment and a second value of serving a second replacement advertisement segment, the content-management system 108 can use the first value and the second value for selecting between the first replacement advertisement segment and the second replacement advertisement segment. For instance, based on the first value being greater than the second value, the content-management system 108 can select the first replacement advertisement segment. Alternatively, based on the first value being less or equal to than the second value, the content-management system 108 can select the second replacement advertisement segment.

Alternatively, the content-management system can select a replacement advertisement segment by comparing an estimated value of serving the replacement advertisement segment to the content-presentation device 104 to a threshold amount. For instance, upon determining that an estimated value of serving a given advertisement segment satisfies a threshold condition (e.g., is greater than a threshold amount), the content-management system 108 can select the advertisement segment. Whereas, upon determining that the estimated value of serving the given advertisement segment does not satisfy a threshold condition (e.g., is not greater than the threshold amount), the content-management system 108 can decide not to select the advertisement segment and, optionally, select another advertisement segment or forgo carrying out a content modification operation.

After selecting a replacement advertisement segment, the content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

In some examples, for one or more content-presentation devices, the operation-related data can include a content replacement operation success rate. In line with the discussion above, the content replacement operation success rate for a given content-presentation device. The content replacement operation success rate is indicative of a percentage of attempted content replacement operations that actually resulted in a viewed replacement advertisement segment. For instance, the content replacement operation success rate may indicate a percentage of attempted content replacement operations for which the content-presentation device 104 presented a replacement advertisement segment for a duration that satisfies a pay point of the replacement advertisement segment.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Example Method

Figure 5:
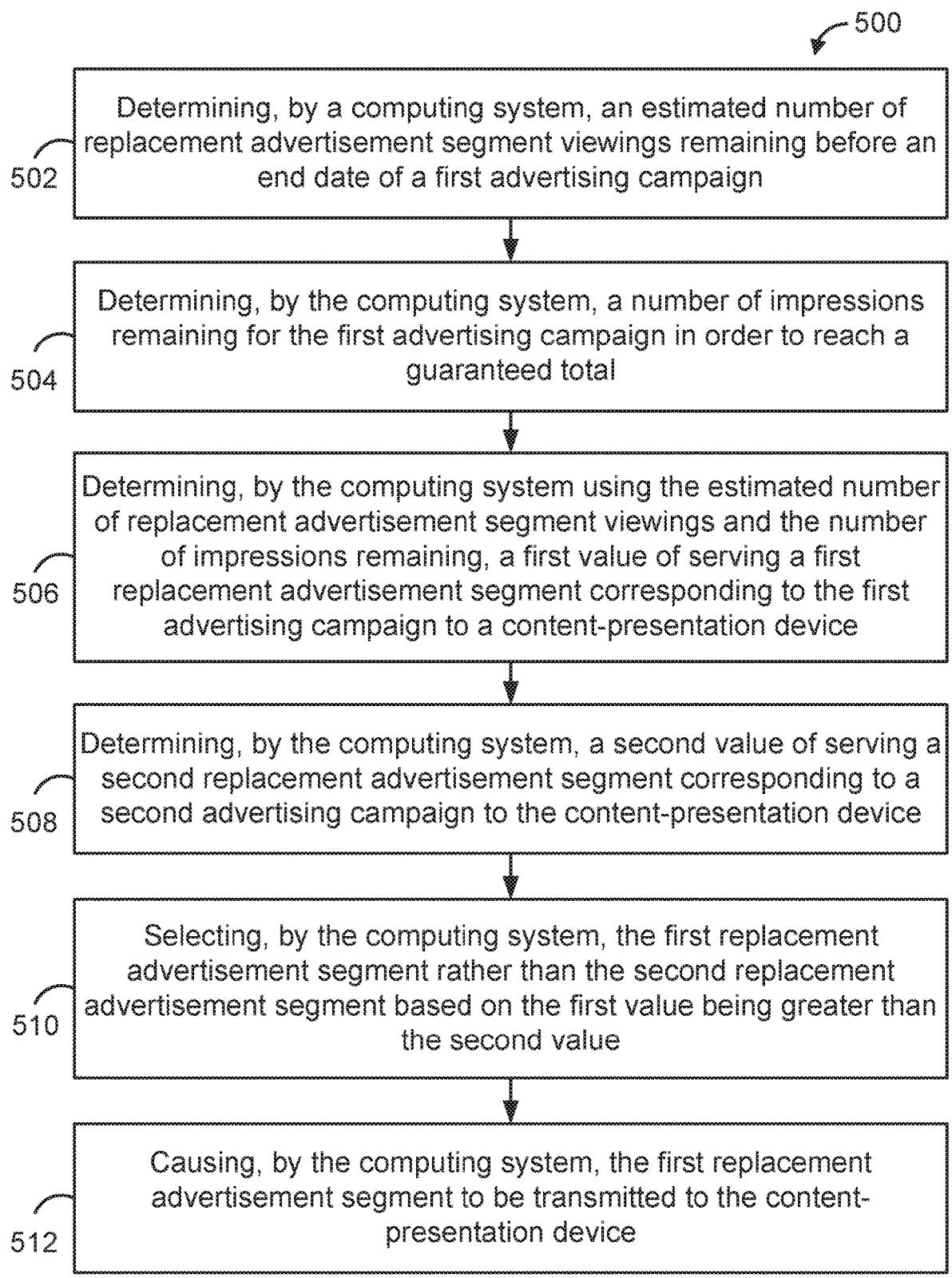
FIG. 5 is a flow chart of an example method.

FIG. 5 is a flow chart of an example method 500. Method 500 can be carried out by a content-management system, such as the content-management system 108 or more generally, by a computing system. At block 502, method 500 includes determining, by a computing system, an estimated number of replacement advertisement segment viewings remaining before an end date of a first advertising campaign. At block 504, method 500 includes determining, by the computing system, a number of impressions remaining for the first advertising campaign in order to reach a guaranteed total. At block 506, method 500 includes determining, by the computing system using the estimated number of replacement advertisement segment viewings and the number of impressions remaining, a first value of serving a first replacement advertisement segment corresponding to the first advertising campaign to a content-presentation device. At block 508, method 500 include determining, by the computing system, a second value of serving a second replacement advertisement segment corresponding to a second advertising camping to the content-presentation device. At block 510, method 500 includes selecting, by the computing system, the first replacement advertisement segment rather than the second replacement advertisement segment based on the first value being greater than the second value. And at block 512, the method 500 includes causing, by the computing system, the first replacement advertisement segment to be transmitted to the content-presentation device.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
 transmitting, by a computing system over a channel associated with a television broadcast provider, linear sequence of content segments to a content-presentation device of multiple content-presentation devices, wherein the linear sequence of content segments comprises an advertisement segment;
 determining, by the computing system, for each of the multiple content-presentation devices, a respective estimated number of content replacement operation opportunities remaining within the linear sequence of content segments before an end date of a first advertising campaign, wherein determining the respective estimated number of content-replacement operation opportunities for a given content-presentation device of the multiple content-presentation devices is initiated based on a request from the content-presentation device and comprises:
  determining a plurality of content replacement operation opportunities available on the channel before the end date of the first advertising campaign, wherein the plurality of content replacement operation opportunities comprises a content replacement opportunity in the linear sequence of content segments;
  determining, for a content replacement operation opportunity of the plurality of content replacement operation opportunities, a probability that the content-presentation device will be tuned to the channel at a time of the content replacement operation opportunity; and
  determining the respective estimated number of content replacement operation opportunities based on the probability;
 determining, by the computing system, an estimated number of replacement advertisement segment viewings remaining before the end date of the first advertising campaign based on the respective estimated numbers of content replacement operation opportunities;
 determining, by the computing system, a number of impressions remaining for the first advertising campaign in order to reach a guaranteed total of the first advertising campaign;
 determining, by the computing system using the estimated number of replacement advertisement segment viewings and the number of impressions remaining, a first value of serving a first replacement advertising segment corresponding to the first advertising campaign to the content-presentation device;
 determining, by the computing system, a second value of serving a second replacement advertisement segment corresponding to a second advertising campaign to the content-presentation device;

selecting, by the computing system, the first replacement advertisement segment rather than the second replacement advertisement segment based on the first value being greater than the second value; and transmitting, by the computing system, the first replacement advertisement segment to the content-presentation device via a broadcast stream transmission, wherein the first replacement advertisement segment is configured to replace the advertisement segment in the linear sequence of content segments, wherein the broadcast stream transmission is different from the channel associated with the television broadcast provider.

2. The method of claim 1, further comprising determining a content replacement operation success rate for the content-presentation device of the multiple content-presentation devices, wherein determining the respective estimated number of content replacement operation opportunities remaining for the content-presentation device is further based on the content replacement operation success rate.

3. The method of claim 1, wherein determining the probability comprises determining the probability based on historical content consumption data for the content-presentation device.

4. The method of claim 1, wherein determining the probability comprises determining the probability based on a current channel to which the content-presentation device is tuned.

5. The method of claim 1, wherein determining the plurality of content replacement operation opportunities available on the channel comprises determining the plurality of content replacement operation opportunities based on a broadcast schedule for the channel.

6. The method of claim 1, wherein determining the first value comprises: determining a baseline cost per thousand (CPM) for the first replacement advertisement segment; and converting the baseline CPM to a calculated CPM using the estimated number of replacement advertisement segment viewings and the number of impressions remaining.

7. The method of claim 1, wherein:

the computing system comprises a content-management system; and the method further comprises receiving, by the content-management system from the content-presentation device, a request for supplemental content for use in connection with performing a content-modification operation.

8. A non-transitory computer-readable medium having stored thereon program instructions that upon execution by a processor, cause performance of a set of acts comprising:

transmitting, over a channel associated with a television broadcast provider, linear sequence of content segments to a content-presentation device of multiple content-presentation devices, wherein the linear sequence of content segments comprises an advertisement segment;

determining for each of the multiple content-presentation devices, a respective estimated number of content replacement operation opportunities remaining within the linear sequence of content segments before an end date of a first advertising campaign, wherein determining the respective estimated number of content-replacement operation opportunities for a given content-presentation device of the multiple content-presentation devices is initiated based on a request from the content-presentation device and comprises:

determining a plurality of content replacement operation opportunities available on the channel before the end date of the first advertising campaign, wherein the plurality of content replacement operation opportunities comprises a content replacement opportunity in the linear sequence of content segments;

determining, for a content replacement operation opportunity of the plurality of content replacement operation opportunities, a probability that the content-presentation device will be tuned to the channel at a time of the content replacement operation opportunity; and determining the respective estimated number of content replacement operation opportunities based on the probability;

determining an estimated number of replacement advertisement segment viewings remaining before the end date of the first advertising campaign based on the respective estimated numbers of content replacement operation opportunities;

determining a number of impressions remaining for the first advertising campaign in order to reach a guaranteed total of the first advertising campaign;

determining, using the estimated number of replacement advertisement segment viewings and the number of impressions remaining, a first value of serving a first replacement advertising segment corresponding to the first advertising campaign to the content-presentation device;

determining a second value of serving a second replacement advertisement segment corresponding to a second advertising campaign to the content-presentation device;

selecting the first replacement advertisement segment rather than the second replacement advertisement segment based on the first value being greater than the second value; and transmitting the first replacement advertisement segment to the content-presentation device via a broadcast stream transmission, wherein the first replacement advertisement segment is configured to replace the advertisement segment in the linear sequence of content segments, wherein the broadcast stream transmission is different from the channel associated with the television broadcast provider.

9. The non-transitory computer-readable medium of claim 8, wherein:

the set of acts further comprises determining a content replacement operation success rate for the content-presentation device, and determining the respective estimated number of content replacement operation opportunities remaining is further based on the content replacement operation success rate.

10. The non-transitory computer-readable medium of claim 8, wherein determining the probability comprises determining the probability based on historical content consumption data for the content-presentation device.

11. The non-transitory computer-readable medium of claim 8, wherein determining the probability comprises determining the probability based on a current channel to which the content-presentation device is tuned.

12. A computing system comprising:
one or more processors; and
a non-transitory computer-readable medium having stored therein instructions that are executable by the one or more processors to cause the computing system to perform a set of acts comprising:
- transmitting, over a channel associated with a television broadcast provider, linear sequence of content segments to a content-presentation device of multiple content-presentation devices, wherein the linear sequence of content segments comprises an advertisement segment;
- determining, by the computing system, for each of the multiple content-presentation devices, a respective estimated number of content replacement operation opportunities remaining within the linear sequence of content segments before an end date of a first advertising campaign, wherein determining the respective estimated number of content-replacement operation opportunities for a given content-presentation device of the multiple content-presentation devices is initiated based on a request from the content-presentation device and comprises:
  - determining a plurality of content replacement operation opportunities available on the channel before the end date of the first advertising campaign, wherein the plurality of content replacement operation opportunities comprises a content replacement opportunity in the linear sequence of content segments;
  - determining, for a content replacement operation opportunity of the plurality of content replacement operation opportunities, a probability that the content-presentation device will be tuned to the channel at a time of the content replacement operation opportunity; and
  - determining the respective estimated number of content replacement operation opportunities based on the probability;
- determining an estimated number of replacement advertisement segment viewings remaining before the end date of the first advertising campaign based on the respective estimated numbers of content replacement operation opportunities;
- determining a number of impressions remaining for the first advertising campaign in order to reach a guaranteed total of the first advertising campaign;
- determining, using the estimated number of replacement advertisement segment viewings and the number of impressions remaining, a first value of serving a first replacement advertising segment corresponding to the first advertising campaign to the content-presentation device;
- determining a second value of serving a second replacement advertisement segment corresponding to a second advertising campaign to the content-presentation device;
- selecting the first replacement advertisement segment rather than the second replacement advertisement segment based on the first value being greater than the second value; and
- transmitting the first replacement advertisement segment to the content-presentation device via a broadcast stream transmission, wherein the first replacement advertisement segment is configured to replace the advertisement segment in the linear sequence of content segments, wherein the broadcast stream transmission is different from the channel associated with the television broadcast provider.

13. The computing system of claim 12, wherein:
the set of acts further comprises determining a content replacement operation success rate for the content-presentation device, and
determining the respective estimated number of content replacement operation opportunities remaining is further based on the content replacement operation success rate.

14. The computing system of claim 12, wherein determining the probability comprises determining the probability based on historical content consumption data for the content-presentation device.

* * * * *